United States Patent [19]

Hekimian et al.

[11] 3,916,329

[45] Oct. 28, 1975

[54] TIME JITTER GENERATOR

[75] Inventors: Norris C. Hekimian, Rockville; Robert M. Ginnings, Potomac, both of Md.

[73] Assignee: Hekimian Laboratories, Inc., Rockville, Md.

[22] Filed: May 1, 1974

[21] Appl. No.: 465,803

[52] U.S. Cl. .................................... 328/155; 329/104

[51] Int. Cl. .............................. H04b 1/66; H03k 9/00

[58] Field of Search ...... 307/208, 269; 328/55, 155, 328/37; 329/104

[56] References Cited

UNITED STATES PATENTS

| | | | |
|---|---|---|---|
| 3,577,086 | 5/1971 | Kliman | 328/55 |
| 3,593,044 | 7/1971 | McNeilly | 328/155 |
| 3,728,635 | 4/1973 | Eisenberg | 328/37 |
| 3,760,280 | 9/1973 | Covington | 307/208 |
| 3,833,854 | 9/1974 | Schonover | 328/55 |

*Primary Examiner*—Robert K. Schaefer
*Assistant Examiner*—John J. Feldhaus
*Attorney, Agent, or Firm*—Rose & Edell

[57] ABSTRACT

A time jitter generator, for use in testing the impact of jitter on digital equipment, introduces a continuously variable static delay and/or time jitter on digital data and clock pulse trains. Static delay is achieved by passing the clock train through a series of cascaded one shot circuits, each one-shot triggering on the trailing edge of the pulse from the preceding circuit. The trailing edge of each one-shot pulse also clocks data into a corresponding stage of a shift register so that each shift register stage is clocked at a different time depending upon the pulse widths of the one-shot circuits. These widths are adjustable under operator control to permit controlled static delay to be achieved over a relatively large continuous range of delay. The control voltage employed to control one-shot pulse width is applied through a delay-responsive feedback loop to eliminate temperature effects. Jitter modulation is achieved by summing a time-varying jitter signal with the control voltage, the jitter signal having a frequency lying outside the bandwidth of the static delay loop.

9 Claims, 2 Drawing Figures

TIME JITTER GENERATOR

BACKGROUND OF THE INVENTION

The present invention relates to time jitter generators for use in testing digital equipment and, more particularly, to circuitry for introducing static delay and time jitter modulation into digital data and clock pulse trains.

Time jitter simulation of pulse code modulated (PCM) signals provides an effective means of evaluating both digital equipment and communication system performance. Its use in the field allows off-line testing with controlled and repeatable test conditions which can be invaluable for locating faults that cannot be detected when the equipment is in use. In the laboratory the ability to simulate a variety of both dynamic and elastic delay conditions permits a complete analysis of acceptable performance limits and reduces the costs and limitations of field testing. As used herein the term elastic or static delay refers to a slowly varying or constant time delay as might occur and build up in a pulse transmission medium; dynamic delay or jitter refers to pulse delays of a rapidly changing and, most often, random nature.

Static delay of data and/or clock pulses is usually achieved with the aid of a shift register in which all stages are clocked simultaneously. Delays corresponding to an integral number of bits are achieved by merely taking the output from the appropriate shift register stage. Although the clock rate can be varied, delays equivalent to other than an integral number of bits cannot be achieved by this scheme. Moreover, in switching from one clock rate to another one could lose multiple data bits and thereby render measurements at the system under test inaccurate.

It is therefore one object of the present invention to provide a jitter generator capable of effecting a static delay over a continuous delay range.

It is another object of the present invention to provide a jitter generator capable of introducing dynamic time jitter into a train of pulses.

It is still another object of the present invention to provide test equipment capable of receiving a train of pulses and selectively introducing a known static delay adjustable over a large continuous range and/or dynamic time jitter into the train.

SUMMARY OF THE INVENTION

According to the present invention a jitter generator receives a train of data pulses accompanied by a synchronized train of clock pulses. The clock pulses are passed through a series of cascaded one-shot multivibrators for which the output pulse durations are controlled by a common delay control voltage. The trailing edge of the output pulse from each one-shot triggers the next one-shot in the series and also clocks a corresponding flip-flop in a shift register arranged to receive the data pulse train. The delay control voltage is operator adjustable and is applied to the one-shots via a delay-responsive loop to eliminate temperature-dependence in the circuit. The delay control voltage is modulated by a jitter signal, at frequencies outside the loop frequency response, to effect random time jitter in the delayed clock and data pulse trains.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF PREFERRED EMBODIMENT

Figure 1:
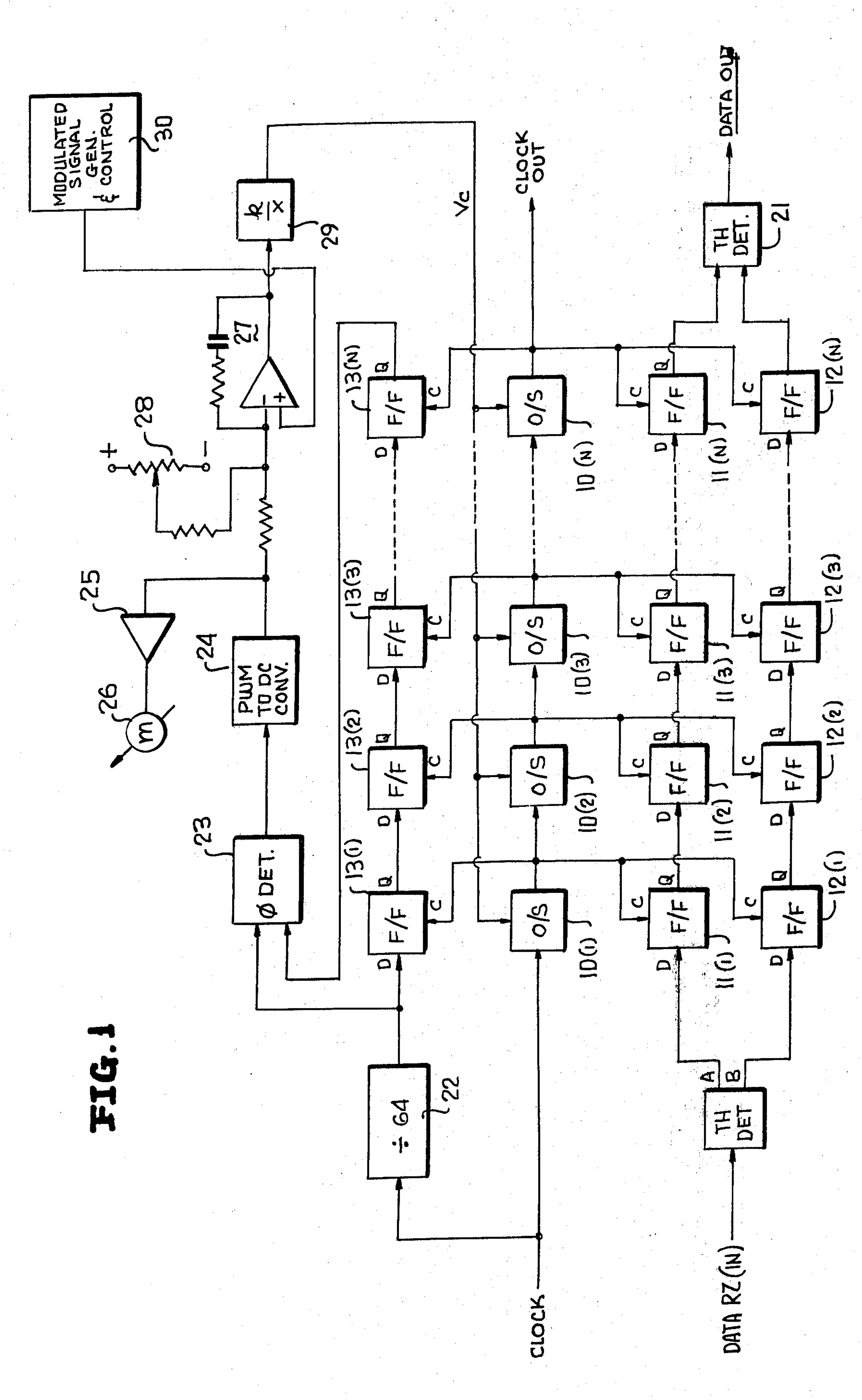
FIG. 1 is a schematic diagram of the jitter generator of the present invention.
Figure 2:
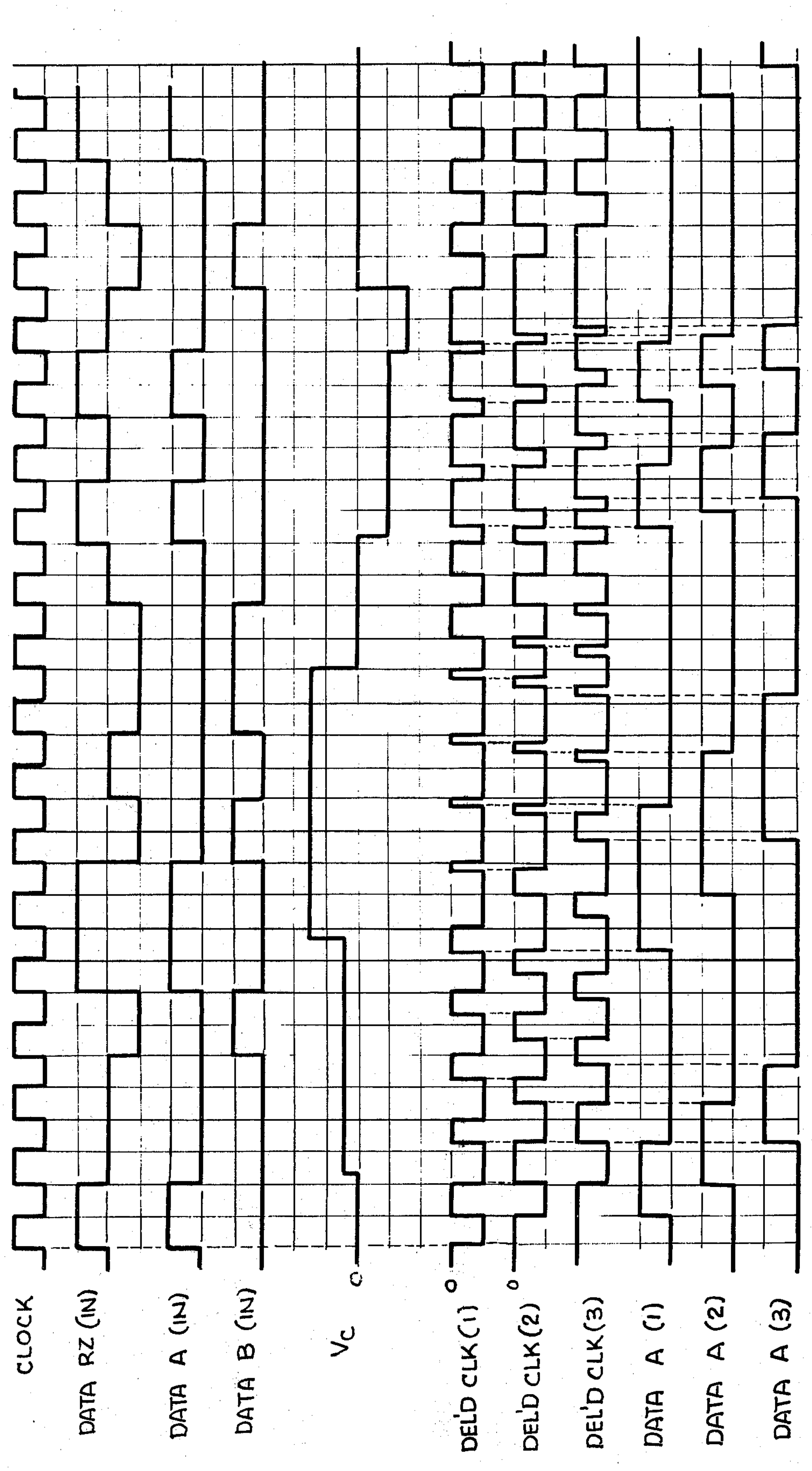
FIG. 2 is a timing diagram illustrating the waveforms of certain signals in the circuit of FIG. 1 during an exemplary mode of operation.

Referring specifically to FIG. 1, the jitter generator of the present invention requires both DATA and CLOCK input pulse trains. More specifically, the generator is capable of imparting known delay and/or jitter to the data pulses if transitions in the data train are synchronized to the clock pulse train. For purposes of the present description, and by no means a limiting condition on the inventive concept described herein, it is assumed that transitions between discrete levels in the data train only occur during a rising or positive-going edge of a clock pulse. A typical clock train waveform is illustrated in FIG. 2 and is designated CLOCK; a typical data train waveform is similarly illustrated and is designated DATA RZ (IN). It should be noted that the data train has three states (i.e. ternary). It is to be understood that a binary data pulse train could also be processed within the scope of the present invention.

The CLOCK pulses are applied to a series of cascaded one-shot multivibrators 10(1), 10(2), 10(3) . . . 10(N). The first one shot 10(1) receives the CLOCK train as its input signal; all other one-shots receive the output pulse from the immediately preceding stage. The one-shots are of the type which normally provide binary one or relatively positive output levels and are switched by a positive-going input transition to temporarily provide a low or binary zero output level. The duration of the binary zero level is determined by the magnitude of a control voltage $V_c$ applied to all of the one-shots. One-shot circuits of this type are commercially available from a variety of sources and have their time intervals determined by the period required for an internal capacitor (not shown) to charge to the level of control voltage $V_c$. The positive-going transition at the end of each one-shot output pulse triggers the next one-shot.

The DATA RZ (IN) signal is applied to a bi-level threshold detector circuit 20. When the level of the DATA RZ (IN) signal is relatively positive (i.e. exceeding both threshold levels), the A output line of circuit 20 is high and the B output line is low. If the DATA RZ (IN) level is between the two threshold levels of circuit 20, lines A and B are both low. If the DATA RZ (IN) level is below threshold levels of circuit 20, line A is low and line B is high. Each of the A and B lines are therefore pulse trains which alternate between two binary levels in accordance with the level of the DATA RZ (IN) signal. It follows that, if the input data is in the form of a binary rather than ternary pulse train, the said B outputs of circuit 20 will be complementary.

Pulses appearing on the A output line of threshold circuit 20 are applied to a shift register comprising cascaded flip-flops 11(1), 11(2), 11(3) . . . 11(N). Likewise the pulses on line B are applied to a shift register comprising cascaded flip-flops 12(1), 12(2), 12(3) . . . 12(N). The flip-flops in these shift registers are of the clocked data type; that is, the binary level appearing at the D input terminal of the flip-flop is transferred to the Q output terminal of that flip-flop in response to a positive-going transition at the C input terminal. The transferred level is held until the opposite binary level is present at the D terminal in time-coincidence with a positive-going transition at the C terminal. Flip-flops 11(1) and 12(1) receive the A and B pulse trains respectively, at their D input terminals. All other flip-flops 11 and 12 receive the Q output level from the previous stage at their D terminal. The clock signal for stages 11(1) and 12(1) is the output signal from one-shot 10(1). Likewise, each stage in the shift registers 11, 12, is clocked by a corresponding one-shot 10. The Q output signals from stages 11(N) and 12(N) are applied to another threshold circuit 21 which serves to convert the delayed data from the two binary data trains into a single binary or ternary data train depending on the input data. The DATA OUT signal provided by circuit 21 is therefore a replica of the DATA RZ (IN) signal, delayed in time by the action of one-shots 10 and flip-flops 11 and 12.

The CLOCK pulse train is also applied to frequency divider 22 wherein the repetition rate of the CLOCK signal is divided by sixty-four. This division factor is selected so that the period of the divided waveform is larger than the maximum static delay through the cascaded one-shots. The frequency-divided pulse train provided by divider 22 is applied to another shift register comprising flip-flops 13(1), 13(2), 13(3) . . . 13(N). These flip-flops are also of the clocked data type (as are flip-flops 11, 12) and utilize the Q output signal. Thus, when a flip-flop 13 is clocked, its Q output signal assumes the binary level present at its D input terminal. Clocking of stages 13(1), 13(2), 13(3) . . . 13(N) is effected by the output pulses from one-shots 10(1), 10(2), 10(3) . . . 10(N), respectively.

The Q output signal from flip-flop 13(N) is applied to a phase detector 23 along with the output signal from frequency divider 22. The phase detector may be, for example, an exclusive OR gate which provides a positive output level when either but not both input signals are positive and a zero output level at all other times. Alternatively, the phase detector may be an S/R flip-flop. If the two input signals to the exclusive OR phase detector are 90° apart (180° for the S/R flip-flop), the phase detector output signal alternates from positive to zero with a 50% duty cycle. As the phase difference between the two input signals varies from this spacing, the output level remains either positive or zero for a greater portion of signal period. The duty cycle of the output signal from phase detector 23 therefore provides a measure of the delay imparted to the output signal from divider 22 by shift register stages 13.

The variable-duty cycle square wave from phase detector 23 is applied to a pulse width modulation-to-DC converter circuit 24. This circuit may take the form of an integrator arranged to provide a positive voltage level proportional to the duty cycle of the binary one level in the phase detector output signal. The DC output level from circuit 24 is a measure of the delay imparted to the data by the cascaded one shots 10(1) . . . 10(N). This DC level is monitored by meter 26 via meter driver circuit 25, and is also applied to operational integrator 27 along with an operator-adjustable DC level from potentiometer 28. The integrator output signal is applied to a k/x circuit 29 which provides an output voltage that varies inversely with the applied voltage. Such circuits are commercially available, generally being described as analog dividers. The output signal Vc from circuit 29 is applied to one shots 10 to control the pulse duration therein. This voltage (Vc) is thus proportional to the delay effected by the one shots; the output voltage from integrator 27, on the other hand, is inversely proportional to the delay. The closed loop formed by elements 23, 24, 27, 29, 10 and 13 serves to eliminate the effects of temperature variations and power supply fluctuations on the delay. Loop operation is keyed to the setting of potentiometer 28; that is, the loop operates to maintain the output voltage from circuit 24 equal to voltage derived from the potentiometer. The loop time constant, determined primarily by integrator 27, is relatively long (on the order of one second) so that short term variations in signal levels have little or no effect.

A modulation signal generator and control circuit 30 provides a relatively high frequency jitter signal which is inserted into the positive input of integrator 27. The jitter signal may have a regular periodic waveform or a random waveform. In either case it has the effect of introducing an AC jitter component onto the control voltage Vc to thereby introduce jitter into the clock and data trains. The jitter signal is at a sufficiently high frequency to reside outside of the passband of the loop; therefore, the jitter signal does not affect loop operation. Typical operation of the jitter generator is represented by the waveforms of FIG. 2. The input signals to the generator are the CLOCK signal and the ternary DATA RZ (IN) signal, the latter taking the form of an arbitrary data sequence for purposes of this description. The DATA A (IN) and DATA B (IN) signals represent the binary signals appearing on output lines A and B of circuit 20 in response to the assumed DATA RZ (IN) waveform. It is also assumed that the control voltage Vc is varied by means of potentiometer 28 as indicated in FIG. 2, these variations again being arbitrarily chosen for purposes of this description.

The DEL'D CLK (I) waveform represents the output signal from one-shot 10(1) in response to the applied CLOCK signal. It is to be noted that the output pulses from one-shot 10(1) are relatively negative, with each negative-going transition occurring in response to a positive-going transition in the CLOCK train. When control voltage Vc is at its nominal reference level (as illustrated for the first clock interval), the duty cycle of the DEL'D CLK (1) waveform is 50%. As Vc is increased, the width of binary zero DEL'D CLK (1) pulses increase accordingly; likewise, decreases in the level of Vc result in a decreased width of the DEL'D CLK (1) pulse.

Each positive-going transition of the DEL'D CLK (1) train triggers one-shot 10(2), as illustrated in the DEL'D CLK (2) waveform. Similarly, the DEL'D CLK (3) waveform represents the output signal from one-shot 10(3) which is triggered by each positive-going transition at one-shot 10(2). Since each one-shot is triggered by the trailing edge of the output pulse from the previous one-shot, the delay through the entire N stages can be represented as NT, where T is width of all one-shot output pulses.

The effect of the delayed clock signals on the respective stages in the data shift registers is illustrated in signals DATA A (1), DATA A (2) and DATA A (3); these represent the Q output signals from flip-flops 11(1), 11(2) and 11(3), respectively. Each of these waveforms is essentially a delayed version of the DATA A (IN) waveform appearing at output line A of circuit 20. It is to be noted that each data transition in DATA A (1) is initiated by a positive-going transition in the DEL'D CLK (1) train. Likewise the other delayed clock trains initiate data transitions in corresponding data stages. Thus, since the delay through one-shots 10 is cumulative, the delay in the data shift register is cumulative. This is illustrated most clearly by the waveform DATA A (3) which includes the same data appearing in the DATA A (IN) waveform except that it is delayed by the cumulative delay in one-shots 10(1), 10(2) and 10(3).

By adjusting potentiometer 28 the operator can choose from a wide range of static delay periods and can test various digital equipment accordingly. Importantly, this range of delays is continuous and is not limited to specific incrementally spaced values.

While we have described and illustrated one specific embodiment of our invention, it will be clear that variations of the details of construction which are specifically illustrated and described may be resorted to without departing from the true spirit and scope of the invention as defined in the appended claims.

We claim:

1. A circuit for introducing controlled delay into a train of data pulses, comprising:

a series of N one-shot circuits connected in cascade, each arranged to provide an output pulse with a leading edge initiated in response to the trailing edge of the output pulse from the preceding stage in said series, each one-shot circuit being of the type wherein the width of said output pulse is variable with the level of a control voltage applied to the one-shot circuit;

at least one data shift register comprising N flip-flops connected in cascade, each flip-flop being clocked by the trailing edge of an output pulse from a corresponding one-shot circuit in said series to assume a binary state determined by the state of the preceding flip-flop in said data shift-register;

means for applying a common control voltage to all of said one-shot circuits;

means for applying a binary data pulse train to the first flip-flop in said data shift register; and means for applying a clock pulse train to the first one shot in said series, transitions in said data pulse train being synchronized to transitions in said clock pulse train.

2. The circuit according to claim 1 further comprising:

means for providing a jitter signal having a time-varying amplitude; and means for summing said jitter signal with said common control voltage applied to said one-shot circuits.

3. The circuit according to claim 1 further comprising:

a frequency divider arranged to receive said clock pulse train and provide a frequency-divided pulse train having a repetition rate which is less than the repetition rate of said clock pulse train;

a measurement shift register comprising N flip-flops connected in cascade, each flip-flop being clocked by the trailing edge of an output pulse from a corresponding one-shot circuit in said series to assume a binary state determined by the binary state of the preceding flip-flop in said measurement shift register;

means for applying said frequency-divided pulse train to the first flip-flop in said measurement shift register;

phase detection means for providing a further signal having an amplitude which is a predetermined function of the phase difference between said frequency-divided pulse train and output pulses derived from the Nth flip-flop of said measurement shift register; and control means responsive to said further signal for providing said common control voltage.

4. The circuit according to claim 3 wherein said further signal is a DC signal having an amplitude proportional to said phase difference, and wherein said control means comprises:

an integrator connected to receive an integrate said further signal; and circuit means responsive to the integrated further signal provided by said integrator for providing said common control voltage at a level which varies inversely with the level of said integrated further signal.

5. The circuit according to claim 4 wherein said integrator has a predetermined time constant, said circuit further comprising:

means for providing a jitter signal having a time varying amplitude with periods which are short relative to said predetermined time constant; and means for summing said jitter signal with said integrated further signal.

6. The circuit according to claim 5 further comprising means to permit selective adjustment of said common control voltage.

7. The circuit according to claim 3 further comprising:

means for providing a jitter signal having a time-varying amplitude; and means for summing said jitter signal with said common control voltage applied to said one-shot circuits.

8. The circuit according to claim 1 further comprising means to permit selective adjustment of said common control voltage.

9. The circuit according to claim 1 further comprising:

a threshold detector, responsive to an input data pulse train capable of assuming first, second and third levels with level transitions occurring in time-coincidence with transitions in said clock pulse train, for providing said binary data pulse train alternating between a first voltage which is present when said input data pulse train is at said first level and a second voltage which is present when said input data pulse train is at said second and third levels.

* * * * *